United States Patent
Tai et al.

(10) Patent No.: US 11,768,405 B2
(45) Date of Patent: Sep. 26, 2023

(54) DISPLAY DEVICE

(71) Applicant: InnoLux Corporation, Miao-Li County (TW)

(72) Inventors: Ming-Jou Tai, Miao-Li County (TW); Chia-Hao Tsai, Miao-Li County (TW); Wei-Yen Chiu, Miao-Li County (TW); You-Cheng Lu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 17/547,865

(22) Filed: Dec. 10, 2021

(65) Prior Publication Data

US 2022/0221755 A1    Jul. 14, 2022

(30) Foreign Application Priority Data

Jan. 12, 2021  (CN) .......................... 202110039247.4

(51) Int. Cl.
*G02F 1/1339* (2006.01)
*G02F 1/1335* (2006.01)

(52) U.S. Cl.
CPC .... *G02F 1/13394* (2013.01); *G02F 1/133512* (2013.01); *G02F 1/133514* (2013.01)

(58) Field of Classification Search
None
See application file for complete search history.

(56) References Cited

U.S. PATENT DOCUMENTS

| | | | |
|---|---|---|---|
| 2010/0182530 A1* | 7/2010 | Fujikawa | G02F 1/1339 349/58 |
| 2013/0050619 A1* | 2/2013 | Kim | G02F 1/13394 430/320 |
| 2017/0084231 A1* | 3/2017 | Chew | G09G 3/20 |
| 2017/0124933 A1* | 5/2017 | Evans, V | G06F 1/1637 |
| 2017/0184764 A1* | 6/2017 | Matsuyuki | G02B 5/207 |
| 2017/0205923 A1* | 7/2017 | Shim | G06F 3/044 |
| 2018/0173034 A1* | 6/2018 | Yonemura | G02F 1/1339 |
| 2019/0391434 A1 | 12/2019 | Hung et al. | |
| 2020/0258958 A1* | 8/2020 | Gai | H01L 51/5225 |
| 2021/0408146 A1* | 12/2021 | Ying | H01L 51/5284 |
| 2022/0115454 A1* | 4/2022 | Ko | H01L 27/3218 |
| 2022/0252947 A1* | 8/2022 | Aoki | G02B 6/0055 |

FOREIGN PATENT DOCUMENTS

| | | | | |
|---|---|---|---|---|
| CN | 108628042 A | * | 10/2018 | ......... G02F 1/13394 |
| JP | 5801595 B2 | * | 10/2015 | ......... G02F 1/13338 |

* cited by examiner

*Primary Examiner* — Shan Liu
(74) *Attorney, Agent, or Firm* — MUNCY, GEISSLER, OLDS & LOWE, P.C.

(57) ABSTRACT

A display device includes a first pixel region and a second pixel region adjacent to the first pixel region. The display device includes: a first substrate; a second substrate opposite to the first substrate; and a plurality of spacers disposed between the first substrate and the second substrate. Herein, a first portion of the plurality of spacers are disposed in the first pixel region, a second portion of the plurality of spacers are disposed in the second pixel region, a disposition density of the second portion of the plurality of spacers in the second pixel region is different from a disposition density of the first portion of the plurality of spacers in the first pixel region.

18 Claims, 6 Drawing Sheets

DISPLAY DEVICE

CROSS REFERENCE TO RELATED APPLICATION

This application claims the benefits of the Chinese Patent Application Serial Number 202110039247.4, filed on Jan. 12, 2021, the subject matter of which is incorporated herein by reference.

BACKGROUND

1. Field

The present disclosure related to a display device. More specifically, the present disclosure relates to a display device with a camera under display (CUD) or a face recognizer under display (FRUD).

2. Description of Related Art

Display devices are widely used. For example, cell phones, laptops, cameras, cameras, music players, mobile navigation devices, TVs, etc. used in daily life use the display devices.

As the development of display devices continues to progress, display devices no longer simply display images, but also have other functions. For example, a display device integrated with a camera or a face recognizer has been developed. However, if the camera or face recognition function is to be performed on the display side, part of the display area is often sacrificed, resulting in a reduction in the screen-to-body ratio of the display device.

Therefore, if a display device with a camera under display or a face recognizer under display can be developed, the screen-to-body ratio of the display device can be increased to meet the needs of consumers.

SUMMARY

The present disclosure provides a display device, comprising a first pixel region and a second pixel region adjacent to the first pixel region. The display device of the present disclosure comprises: a first substrate; a second substrate opposite to the first substrate; and a plurality of spacers disposed between the first substrate and the second substrate. Herein, a first portion of the plurality of spacers are disposed in the first pixel region, a second portion of the plurality of spacers are disposed in the second pixel region, a disposition density of the second portion of the plurality of spacers in the second pixel region is different from a disposition density of the first portion of the plurality of spacers in the first pixel region.

The present disclosure provides another display device, comprising a first pixel region and a second pixel region adjacent to the first pixel region. The display device of the present disclosure comprises: a first substrate; a second substrate opposite to the first substrate; a plurality of spacers disposed between the first substrate and the second substrate, wherein a first portion of the plurality of spacers are disposed in the first pixel region, a second portion of the plurality of spacers are disposed in the second pixel region; a plurality of data lines extending along a first direction; and a plurality of scan lines extending along a second direction different from the first direction, wherein the first pixel region comprises a plurality of first pixels, the second pixel region comprises a plurality of second pixels, and a length of one of the plurality of first pixels in at least one of the first direction and the second direction is less than a length of one of the plurality of second pixels in the at least one of the first direction and the second direction.

Other novel features of the disclosure will become more apparent from the following detailed description when taken in conjunction with the accompanying drawings.

DETAILED DESCRIPTION OF EMBODIMENT

Figures 1A, 1B:
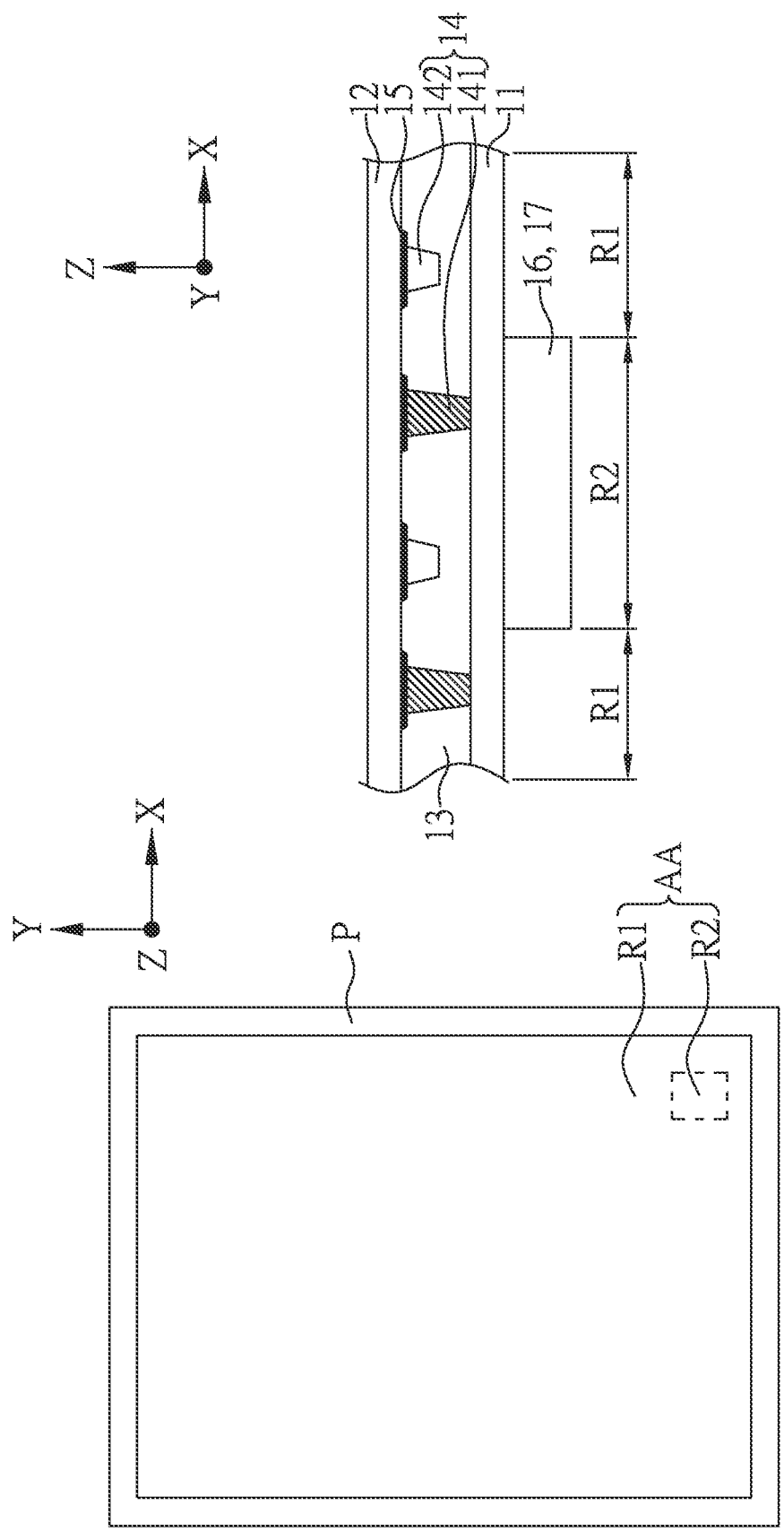
FIG. 1A is a schematic top view of a display device according to one embodiment of the present disclosure.
FIG. 1B is a schematic cross-sectional view of a display device according to one embodiment of the present disclosure.

Different embodiments of the present disclosure are provided in the following description. These embodiments are meant to explain the technical content of the present disclosure, but not meant to limit the scope of the present disclosure. A feature described in an embodiment may be applied to other embodiments by suitable modification, substitution, combination, or separation.

It should be noted that, in the present specification, when a component is described to have an element, it means that the component may have one or more of the elements, and it does not mean that the component has only one of the element, except otherwise specified.

Moreover, in the present specification, the ordinal numbers, such as "first" or "second", are used to distinguish a plurality of elements having the same name, and it does not means that there is essentially a level, a rank, an executing order, or an manufacturing order among the elements, except otherwise specified. A "first" element and a "second" element may exist together in the same component, or alternatively, they may exist in different components, respectively. The existence of an element described by a greater ordinal number does not essentially means the existent of another element described by a smaller ordinal number.

In the present specification, except otherwise specified, the feature A "or" or "and/or" the feature B means the existence of the feature A, the existence of the feature B, or the existence of both the features A and B. The feature A "and" the feature B means the existence of both the features A and B. The term "comprise (s)" "comprising", "include(s)", "including", "have", "has" and "having" means "comprise(s)/comprising but is/are/being not limited to".

Moreover, in the present specification, the terms, such as "top", "upper", "bottom" or "middle", as well as the terms, such as "on", "above", "over", "under", "below", or "between", are used to describe the relative positions among a plurality of elements, and the described relative positions may be interpreted to include their translation, rotation, or reflection.

Furthermore, the terms recited in the specification and the claims such as "above", "over", or "on" are intended not only directly contact with the other element, but also intended indirectly contact with the other element. Similarly, the terms recited in the specification and the claims such as "below", or "under" are intended not only directly contact with the other element but also intended indirectly contact with the other element.

In addition, the term "adjacent" in the specification and claims is used to describe mutual proximity, and does not necessarily mean mutual contact.

Moreover, in the present specification, a value may be interpreted to cover a range within ±20% of the value, and in particular, a range within ±10%, ±5%, ±3%, ±2%, ±1% or ±0.5% of the value, except otherwise specified. The value provided in the present specification is an approximate value, which means the meaning "about" is also included in the present disclosure without specifically specifying "about".

In the present specification, except otherwise specified, the terms (including technical and scientific terms) used herein have the meanings generally known by a person skilled in the art. It should be noted that, except otherwise specified in the embodiments of the present disclosure, these terms (for example, the terms defined in the generally used dictionary) should have the meanings identical to those known in the art, the background of the present disclosure or the context of the present specification, and should not be read by an ideal or over-formal way.

In addition, the display device disclosed in the present disclosure may include a touch display device, a curved display device or a free shape display device, but is not limited to this. The display device can be a bendable or flexible display device. The display layer of the display device may include, for example, liquid crystal, light emitting diode, quantum dot (QD), fluorescence, phosphor or other suitable display media, or a combination thereof, but is not limited to this. In the present disclosure, the light emitting diode may include, for example, OLED, LED, mini LED, micro LED, QD light emitting diode (for example, QLED, QDLED) or other suitable materials, or any combination thereof, but is not limited to this. The display device may include, for example, a tiled display device, but is not limited to this. It should be noted that the display device can be any combination of the foregoing, but is not limited to this. In addition, the appearance of the display device may be rectangular, circular, polygonal, a shape with curved edges, or other suitable shapes. The display device may be provided with a driving system, a control system, a light source system, a shelf system or other peripheral systems to support a display device or a tiled display device.

FIG. 1A is a schematic top view of a display device according to one embodiment of the present disclosure. As shown in FIG. 1A, the display device of the present embodiment comprises: a display region AA; and a border region P at to the display region AA. In addition, the display device of the present embodiment further comprises: a first pixel region R1 and a second pixel region R2 adjacent to the first pixel region R1, wherein the first pixel region R1 and the second pixel region R2 are different regions of the display region AA. In the present: embodiment, the first pixel region R1 and the second pixel region R2 are the regions capable of displaying images. The difference between the first pixel region R1 and the second pixel region R2 is that, the first pixel region R1 is the region for displaying images, and the second pixel region R2 can not only display images but also corresponds to a camera pixel region or a face recognition pixel region. It should be noted that, although the second pixel region R2 shown in FIG. 1A is rectangular, the second pixel region R2 of the present disclosure can be modified to have other suitable shapes according to the actual needs.

FIG. 1B is a schematic cross-sectional view of a display device according to one embodiment of the present disclosure. As shown in FIG. 1B, the display device of the present embodiment comprises: a first substrate 11; a second substrate 12 opposite to the first substrate 11; and a plurality of spacers 14 disposed between the first substrate 11 and the second substrate 12 and contacting the first substrate 11 and/or the second substrate 12. In addition, a portion of the plurality of spacers 14 are disposed in the first pixel region R1, and another portion of the plurality of spacers 14 are disposed in the second pixel region R2. Furthermore, the display device of the present: embodiment: further comprise: a display layer 13 disposed between the first substrate 11 and the second substrate 12.

In the present embodiment, the first substrate 11 and the second substrate 12 may respectively include flexible substrates or non-flexible substrates, and the materials thereof include, for example, glass, quartz, wafer, sapphire, polycarbonate (PC), polyimide (PI), polypropylene (PP), polyethylene terephthalate (PET), other suitable materials or a combination of the aforementioned materials; but the present disclosure is not limited thereto. The materials of the first substrate 11 and the second substrate 12 may be the same or different, depending upon the designs. In addition, in the present embodiment, the display medium included in the display layer 13 may comprise, for example, liquid crystal molecules or the aforesaid light emitting diodes, quantum dots, fluorescence, phosphors or other suitable materials. Furthermore, the material of the spacers 14 may include, for example, resin; but the present disclosure is not limited to this.

As shown FIG. 1B, the display device of the present embodiment may further comprise: a light shielding layer 15 disposed between the first substrate 11 and the second substrate 12 in the present embodiment, the light shielding layer 15 is disposed on a surface of the second substrate 12 facing the display layer 13, but the present disclosure is not limited thereto. In another embodiment of the present disclosure, the light shielding layer 15 may be disposed on a surface of the first substrate 11 facing the display layer 13. In addition, the display device of the present embodiment may further comprise: a color filter layer (not shown in the figure) disposed between the first substrate 11 and the second substrate 12. In one embodiment of the present disclosure, the color filter layer may be disposed on a surface of the first substrate 11 facing the display layer 13. In another embodiment of the present disclosure, the color filter layer may be disposed on a surface of the second substrate 12 facing the display layer 13. Furthermore, the display device of the present embodiment may further comprise: at least one transistor (not shown in the figure), which may be disposed on the first substrate 11.

As described above, the second pixel region R2 can not only display images but also corresponds to a camera pixel region or a face recognition pixel region. In other words, the display device may further comprise a camera unit 16 or a face recognition unit 17 disposed corresponding to the second pixel region R2. In one embodiment of the present disclosure, the camera unit 16 or the face recognition unit 17 may be disposed under the first substrate 11; in this case, the display device may comprise a camera under display (CUD) device or a face recognizer under display (FRUD) device.

When the display device comprises the CUD device or the FRUD device, considering the camera imaging or face recognition performance, the resolution of the second pixel region R2 has to be reduced. Thus, the display device of the present embodiment has the first pixel region R1 with relatively high resolution for displaying and the second pixel region R2 with relatively low resolution corresponding to the camera unit 16 or the face recognition unit 17.

Figure 2:
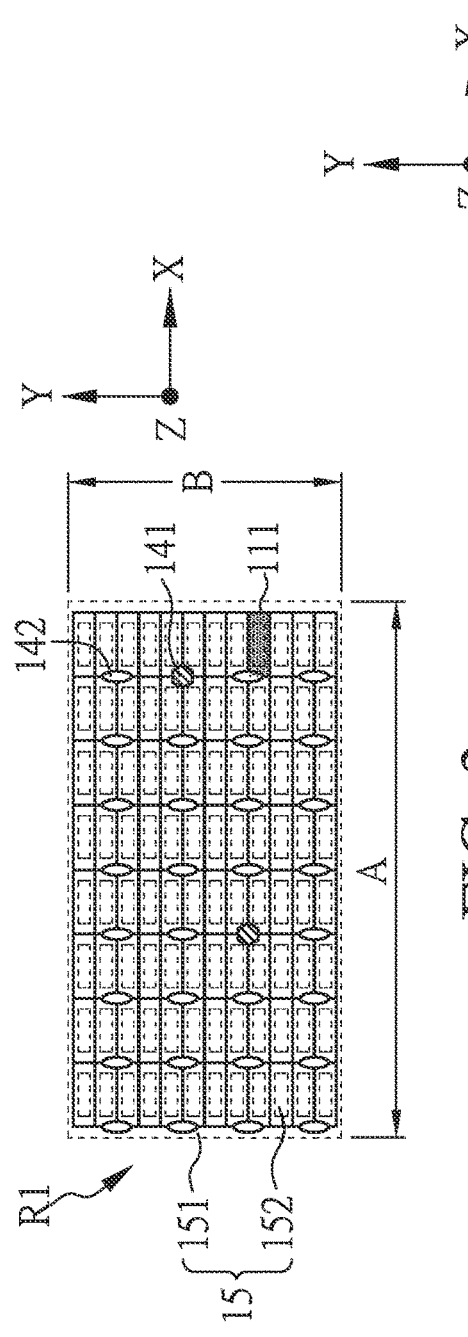
FIG. 2 is a schematic top view of a first pixel region according to one embodiment of the present disclosure.
Figure 3:
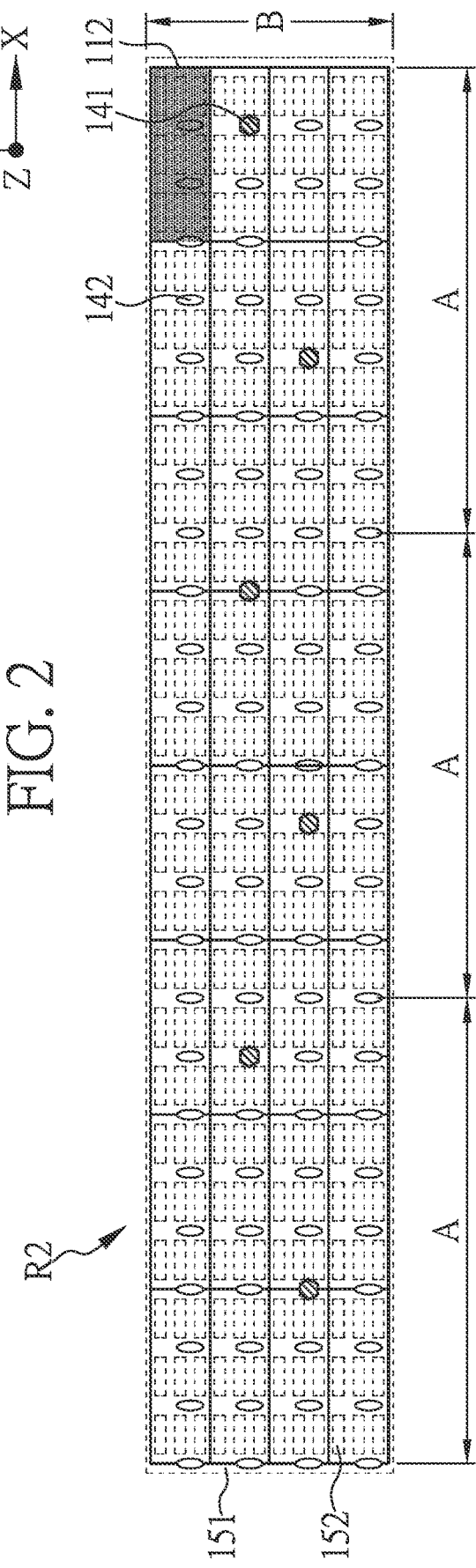
FIG. 3 is a schematic top view of a second pixel region according to one embodiment of the present disclosure.

FIG. 2 is a schematic top view of a first pixel region according to one embodiment of the present disclosure. FIG. 3 is a schematic top view of a second pixel region according to one embodiment of the present disclosure. In FIG. 2 and FIG. 3, for the convenience of description and presentation, only the pixels, the light shielding layer and the spacers are shown. It should be noted that, in the present disclosure, the pixel is the area enclosed by two adjacent data lines (not shown in the figure) and two adjacent scan lines (not shown in the figure). Considering the widths of the data lines and the scan lines, the pixel area can be defined by edges of adjacent data lines and edges of adjacent scan lines. For example, when the data lines extend along the vertical direction (the Y direction shown in FIG. 2) and the scan lines extend along the horizontal direction (the X direction shown in FIG. 2), an area of one pixel can be defined by a left edge of a left data line to a left edge of a right data line and a bottom edge of a bottom scan line to a bottom edge of an upper scan line. An area of one pixel that allows light to pass through is the aperture region of the pixel, which can approximately correspond to the opening 152 of the light shielding layer 15; but the present disclosure is not limited thereto.

In the present embodiment, the distribution of the spacers in a partial region of the first pixel region R1 may be used as a basic unit, which is repeatedly arranged in the X direction and/or the Y direction to obtain the distribution of the spacers in the second pixel region R2. For example, in the present embodiment, FIG. 2 shows a part of the first pixel region R1 shown in FIG. 1A, and this part is a region having a length A and a width B, which is used as a basic unit. In the present embodiment, the size of the basic unit of the first pixel region R1 is not limited to this and can be adjusted according to the needs. FIG. 3 shows a part of the second pixel region R2 shown in FIG. 1A, which is a region having three times the length A and one time the width B. Herein, the basic unit with the length A and the width B shown in FIG. 2 is repeated three time in the X direction to obtain the distribution of the spacers shown in FIG. 3, but the present disclosure is not limited thereto.

As shown in FIG. 2 and FIG. 3, the first pixel region R1 comprises a plurality of first pixels 111 (i.e. the area formed by the solid rectangle in FIG. 2, and the size of this area is the rectangular area with the dot-shaped filling pattern shown in FIG. 2). The second pixel region R2 comprises a plurality of second pixels 112 (i.e. the area formed by the solid rectangle in FIG. 3, and the size of this area is the rectangular area with the dot-shaped filling pattern shown in FIG. 3). Herein, an area of one of the first pixels 111 is less than an area of one of the second pixels 112. In the present embodiment, the area of the second pixel 112 is 9 times (3×3 times)) the area of the first pixel 111. In another embodiment of the present disclosure, the area of the second pixel 112 may be M×N times the area of the first pixel 111, wherein M and N may be integers greater than or equal to 1, and one of M and N is not equal to 1. In one embodiment of the present disclosure, M and N may be the same integer, and may be an integer in a range between 2 to 5. For example, the area of the second pixel 112 may be 4 time (2×2 time), 9 times (3×3 times), 16 times (4×4 times) or 25 times (5×5 times) the area of the first pixel 111, but the present disclosure is not limited thereto. Thus, in the present embodiment, a pixel density of the second pixel region R2 is less than a pixel density of the first pixel region R1. Herein, the term "pixel density" may refer to the number of pixels per unit area. In addition, as shown in FIG. 2 and FIG. 3, the first pixels 111 and the second pixels 112 have rectangular shapes whose lengths in the horizontal direction X are greater than the lengths in the vertical direction Y, but the present disclosure is not limited thereto. In some embodiments, the lengths of the first pixels 111 and the second pixels 112 in the vertical direction Y may be greater than the lengths thereof in the horizontal direction X, or the first pixels 111 and the second pixels 112 may have non-rectangular shapes such as rhombus. In addition, as described above, the pixel is defined by the area enclosed by two adjacent data lines and two adjacent scan lines. Since the area of one of the first pixels 111 is less than the area of one of the second pixels 112, it can be seen from the top view that the length of the first pixel 111 in the extension direction of at least one of the scan line and the data line is less than the length of the second pixel 112 in the same direction.

As shown in FIG. 1B, FIG. 2 and FIG. 3, the display device of the present embodiment further comprises: a light shielding layer 15 (the part shown by dashed lines in FIG. 2 and FIG. 3), wherein the light shielding layer 15 comprises a light shielding region 151 and formed with a plurality of openings 152, and the spacers 14 are disposed in the light shielding region 151 and are not disposed in the openings 152. In addition, the spacers 14 comprises a plurality of main spacers 141 and a plurality of sub spacers 142, and the main spacers 141 and the sub spacers 142 are disposed in the light shielding region 151. As shown in FIG. 1B, one difference between the main spacers 141 and the sub spacers 142 is the height difference in the Z direction (i.e. the normal direction of the first substrate 11)). The height of the main spacers 141 is relatively high, which is mainly used to maintain the cell gap of the display layer 13 within a certain range. The height of the sub spacers 142 is relative low (smaller than the cell gap of the display layer 13), which is mainly used to improve the ability of the panel to withstand pressing. Although the main spacers 141 and the sub spacers 142 are shown in oval shapes in the schematic top views of FIG. 2 and FIG. 3, the shapes of the main spacers 141 and the sub spacers 142 in the present disclosure are not limited thereto. For example, in some embodiments, the main spacers 141 and the sub spacers 142 may have circular or rectangular shapes in the top view.

As shown in FIG. 3, in the display device of the present embodiment, the second pixel region R2 may correspond to a camera pixel region or a face recognition pixel region. Herein, a part of the light shielding region 151 is disposed in the second pixels 112, and a part of the main spacers 141 and the sub spacers 142 can be disposed on the part of the light shielding region 151 in the second pixels 112. In other words, in the first pixel region R1 shown in FIG. 2, each of the first pixels 111 corresponds to one opening 152. In the second pixel region R2 shown in FIG. 3, each of the second pixels 112 corresponds to plural openings 152, so a part of the light shielding region 151 can be disposed in the second pixels 112. In addition, in the second pixel region R2 shown in FIG. 3, since a part of the light shielding region 151 is disposed in the second pixels 112, a part of the main spacers 141 and the sub spacers 142 can be disposed on the part of the light shielding region 151 in the second pixels 112. In the present embodiment, the pattern of the light shielding layer 15 in the second pixel region R2 and/or the distribution of the main spacers 141 and the sub spacers 142 in the second pixel region R2 is designed to be the same as those in the first pixel region R1, but the present disclosure is not limited to this.

When a part of the main spacers 141 and the sub spacers 142 are disposed on the light shielding region 151 in the second pixels 112, the number or area of the main spacers 141 and the sub spacers 142 in the second pixels 112 can be increased, so the disposition density of the spacers can be increased. Thus, the ability of the second pixel region R2 to withstand pressing can be similar to or the same as that of the first pixel region R1, or the problem of abnormal image display caused by the uneven cell gap of the display layer 13 can be improved. Herein, "the disposition density of the spacers" can be represented by the following equation (I):

The disposition density of the spacers=(a total area of the spacers in a region)/(a total area of the pixels corresponding to the region)      (I).

It should be noted that, in the present disclosure, the total area of the main spacers in a region is equal to the area of one main spacer multiplied by the number of the main spacers in this region, and the total area of the sub spacers in the region is equal to the area of one sub spacer multiplied by the number of the sub spacers in this region. If the spacer cannot be calculated as a complete one spacer because it is located at the boundary of the region, the calculation should be based on the area ratio of the spacer in this region. In addition, if the number of the spacers per unit region is calculated, it can be called as the "number density". In the embodiment shown in FIG. 3, the number density of the spacers in the second pixel region R2 is the same as that in the first pixel region R1. However, in other embodiments (for example, the embodiments shown in FIG. 4 to FIG. 7), the number density of the spacers in the second pixel region R2 is less than that in the first pixel region R1.

In the first pixel region R1, the materials of the light shielding region 151, the main spacers 141 and the sub spacers 142 are materials with low visible light transmittance, such as carbon resin or black pigment; but the present disclosure is not limited thereto. In the present embodiment, the second pixel region R2 is a face recognition pixel region, in which the recognition can be achieved through infrared transmittance. Thus, the materials of the light shielding region 151, the main spacers 141 and the sub spacers 142 in the second pixels 112 of the second pixel region R2 can be changed to the materials with higher infrared transmittance such as resin or black pigment with low carbon content or other color pigment mixing materials. Thus, even though the light shielding region 151, the main spacers 141 and the sub spacers 142 in the second pixels 112 are disposed in the second pixels 112 of the second pixel region R2, the function of face recognition still can be achieved. Herein, the materials with "higher infrared transmittance" can be the materials that the transmittance of the infrared light having the wavelength ranged from 780 nm to 2500 nm can reach more than 70%, or even more than 95%.

Figure 4:
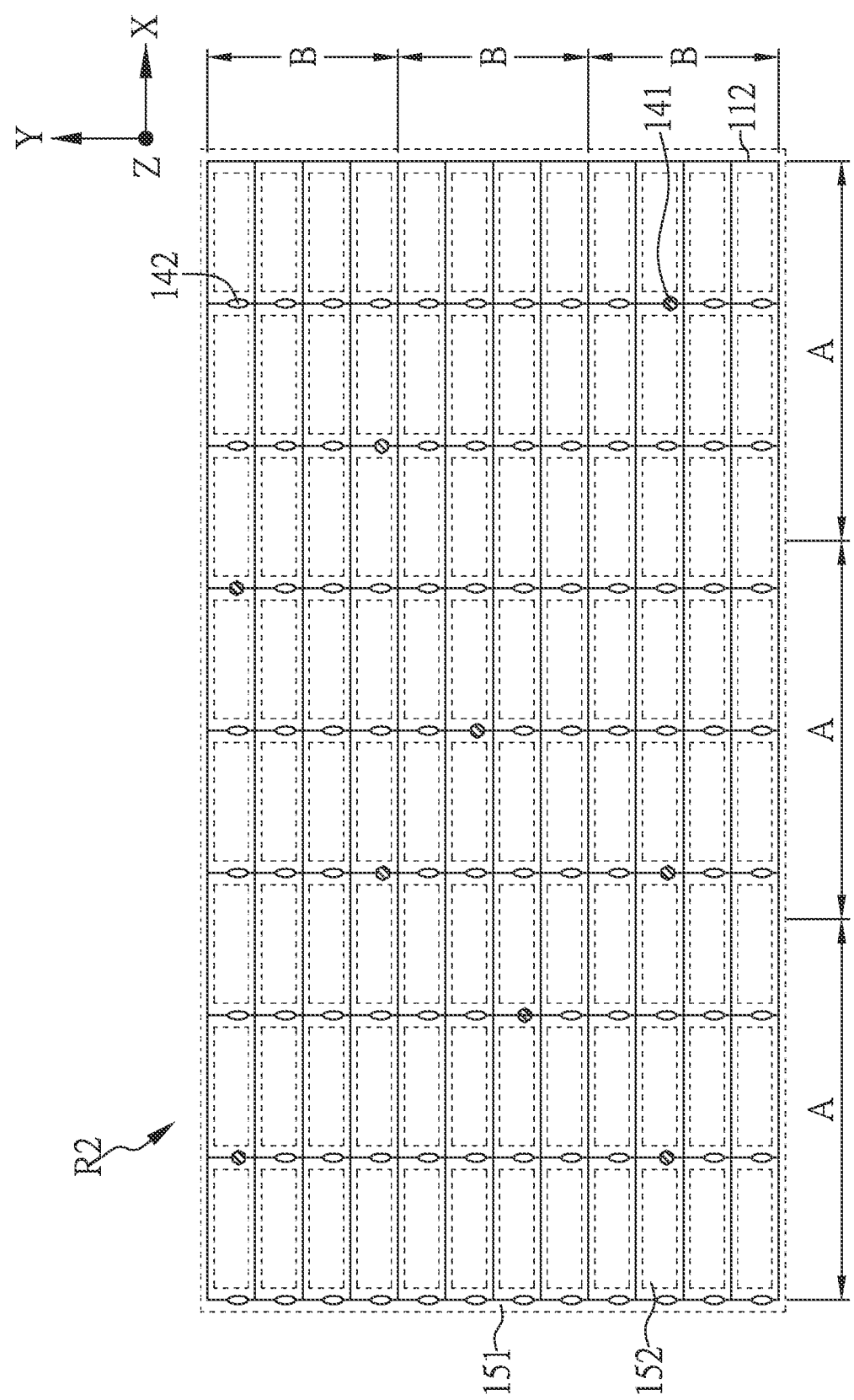
FIG. 4 is a schematic top view of a second pixel region according to another embodiment of the present disclosure.

FIG. 4 is a schematic top view of a second pixel region according to another embodiment of the present disclosure in the display device of the present embodiment, the second pixel region R2 may correspond to a camera pixel region or a face recognition pixel region. In the present embodiment, the structure of the display device and the first pixel region can be similar to those shown in FIG. 1A to FIG. 2, and are not repeated again. One difference between the embodiments shown in FIG. 4 and FIG. 3 is that one second pixel 112 corresponds to plural openings 152 in FIG. 3, one second pixel 112 corresponds to one opening 152 in FIG. 4, and the area of one of the opening 152 in FIG. 4 may be greater than the area of one of the openings 152 in FIG. 3.

As shown in FIG. 4, in the present embodiment, the distribution of the spacers in the region with the length A and the width B shown in FIG. 2 can be used as a basic unit, and this basic unit is repeatedly arranged in the X direction and the Y direction several times. In addition, the area of the openings 152 in FIG. 4 is lager, so the main spacers 141 and the sub spacers 142 corresponding to the openings 152 are removed when the basic unit is repeated arranged, and a part of the sub spacers 142 are replaced by the main spacers 141 to obtain the distribution of the spacers shown in FIG. 4. It should be noted that, in the present embodiment, a part of the main spacers 141 and the sub spacers 142 corresponding to the openings 152 are removed and a part of the sub spacers 142 are replaced by the main spacers 141, so the quantity ratio of the main spacers 141 to the sub spacers 142 in the first pixel region R1 (for example, the quantity ratio is 2:30 in FIG. 2) may be different from the quantity ratio of the main spacers 141 to the sub spacers 142 in the second pixel region R2 (for example, the quantity ratio is 9:87 in FIG. 4).

In the present embodiment, the materials of the light shielding region 151, the main spacers 141 and the sub spacers 142 in the first pixel region R1 and the second pixel region R2 are materials with low visible light transmittance. In order to avoid affecting the imaging of the camera unit or the face recognition function, the light shielding region 151 of the light shielding layer 15 may not be disposed in the middle area of the second pixels 112 (for examples, the middle area can be the region of the second pixels 112 which locates at the middle ⅓ of the length in the X direction and the middle ⅓ of the length in the Y direction), but is disposed on the edges of the second pixels 112, and each of the second pixels 112 corresponds to one opening 152. Meanwhile, the main spacers 141 and the sub spacers 142 are also not disposed in the middle area of the second pixels 112 corresponding to the opening 152.

When the number of the main spacers 141 is too small, the support force of the spacers may be insufficient, affecting the cell gap of the display layer 13. Thus, in the present embodiment, a part of the sub spacers 142 in the second pixel region R2 are replaced by the main spacers 141 to maintain the cell gap of the display layer 13. Although reducing the number of the sub spacers 142 may result in the insufficient ability of the second pixel region R2 to withstand pressing, since the area of the second pixel region R2 is not large and is usually located at the periphery of the display region which is not pressed frequently, even if the ability of the second pixel region R2 to withstand pressing is insufficient, it will not affect the display device too much. It should be noted that, the distribution manner of the main spacers 141 and the sub spacers 142 shown in FIG. 4 is merely an example, and the present disclosure is not limited to this.

As shown in FIG. 2 and FIG. 4, in the present embodiment, the area of the second pixel 112 may be 9 times (3×3 times) the area of the first pixel 111, but the present disclosure is not limited thereto. When the resolution of the second pixel region R2 is reduced (taking the area of the second pixel 112 is 9 times the area of the first pixel 111 in the present embodiment as an example), the positions where the main spacers 141 and the sub spacers 142 can be disposed in the second pixel region R2 may be one third of the positions in the first pixel region R1 in the same area (for example, the area of the region having the length A and the width B shown in FIG. 2). Thus, in the present embodiment, when the total number of the main spacers 141 and the sub spacers 142 is reduced and a part of the sub spacers 142 are replaced by the main spacers 141 in the second pixel region R2, the number of the main spacers 141 in the second pixel region R2 may be greater than one third of the number of the main spacers 141 in the first pixel region R1 and the number of the sub spacers 142 in the second pixel region R2 may be less than one third of the number of the sub spacers 142 in the first pixel region R1 in the same area (for example, the area of the region having the length A and the width B shown in FIG. 2).

Thus, in the display device of the present embodiment, the quantity ratio of the main spacers 141 to the sub spacers 142 in the first pixel region R1 is different: from the quantity ratio of the main spacers 141 to the sub spacers 142 in the second pixel region R2. In particular, in the present embodiment, the quantity ratio of the main spacers 141 to the sub spacers 142 in the first pixel region R1 is less than the quantity ratio of the main spacers 141 to the sub spacers 142 in the second pixel region R2. For example, the quantity ratio of the main spacers 141 to the sub spacers 142 in the first pixel region R1 may be ranged from 1:1 to 1:90 (1≤the number of the sub spacers/the number of the main spacers≤90), and the quantity ratio of the main spacers 141 to the sub spacers 142 in the second pixel region R2 may be ranged from 1:1 to 1:60 (1≤the number of the sub spacers/the number of the main spacers≤60).

In addition, since the resolution of the second pixel region R2 is relatively low and the position where the spacers can be disposed is reduced, the disposition density of the main spacers in the first pixel region R1: the disposition density of the main spacers in the second pixel region R2 may range from 1:1 to 10:1 (1≤the disposition density of the main spacers in the first pixel region R1/the disposition density of the main spacers in the second pixel region R2≤10) in the same area. Similarly, based on the same reason, the disposition density of the sub spacers in the first pixel region R1: the disposition density of the sub spacers in the second pixel region R2 may range from 1:1 to 30:1 (1≤the disposition density of the sub spacers in the first pixel region R1/the disposition density of the sub spacers in the second pixel region R2≤30).

Figure 5:
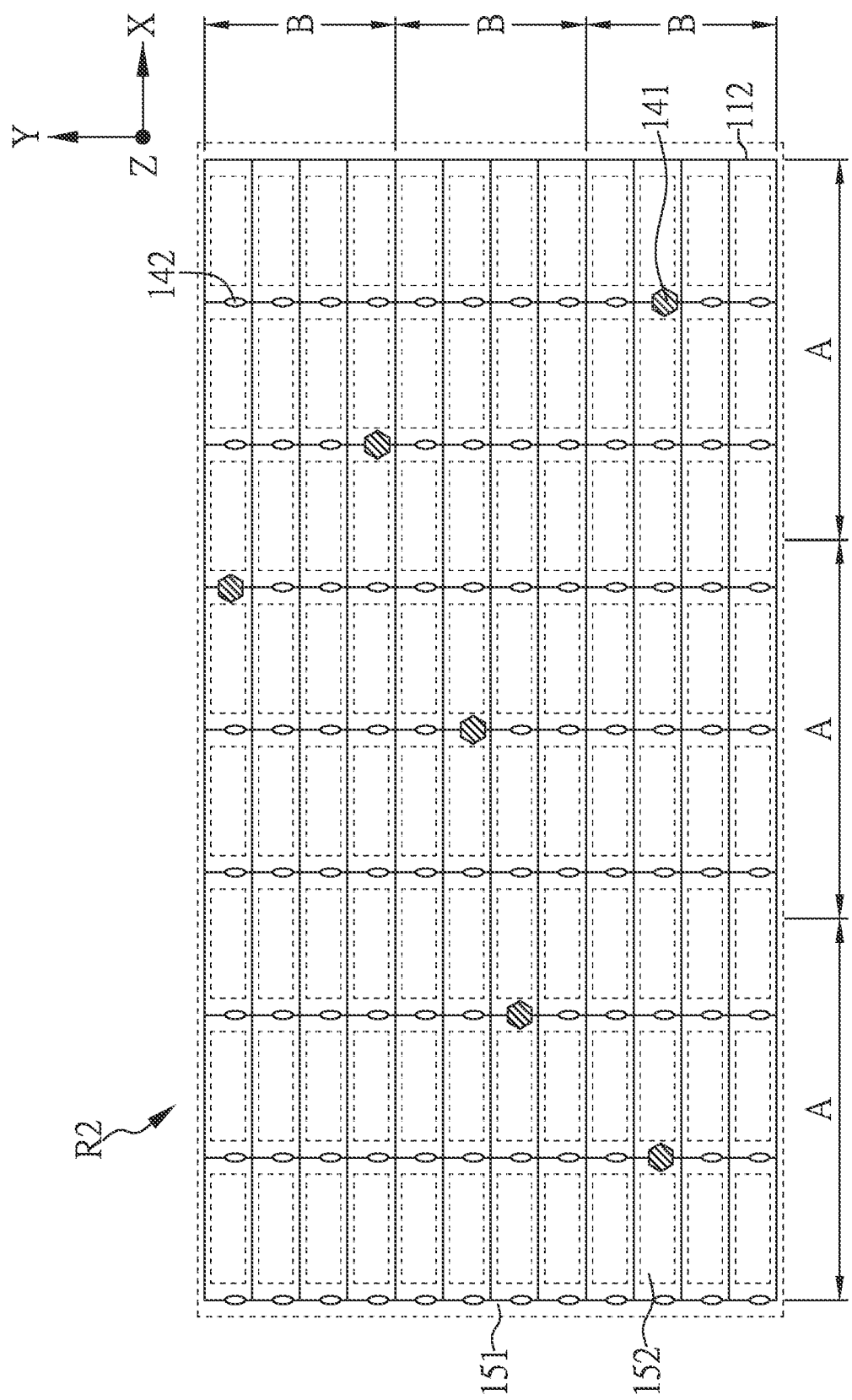
FIG. 5 is a schematic top view of a second pixel region according to another embodiment of the present disclosure.

Please refer to FIG. 2 and FIG. 5. FIG. 5 is a schematic top view of a second pixel region according to another embodiment of the present disclosure. In the display device of the present embodiment, the second pixel region R2 may correspond to a camera pixel region or a face recognition pixel region. In the present embodiment, the structure of the display device and the first pixel region can be similar to those shown in FIG. 1A to FIG. 2, and are not repeated again.

Similar to the embodiment shown in FIG. 4, in the present embodiment shown in FIG. 5, the distribution of the spacers in the region with the length A and the width B shown in FIG. 2 can be used as a basic unit, and this basic unit is repeatedly arranged in the X direction and the Y direction several times. In addition, the main spacers 141 and the sub spacers 142 originally corresponding to the openings 152 are removed to obtain the distribution of the spacers shown in FIG. 5.

One difference between the present embodiment and the embodiment shown in FIG. 4 is that, in the present embodiment, a part of the sub spacers 142 are not replaced by the main spacers 141, but the area of the main spacers 141 are increased to maintain the cell gap of the display layer 13. Although the increasing of the area of the main spacers 141 may result in the aperture ratio of the second pixel region R2 reduced, the openings 152 corresponding to the second pixels 112 shown in FIG. 5 are greater than the openings 152 corresponding to the first pixels 111 shown in FIG. 2, and the impact on the image displaying is not large.

Thus, in the display device of the present embodiment, the area of the main spacers 141 in the first pixel region R1 is less than the area of the main spacers 141 in the second pixel region R2. For example, the area of the main spacers 141 in the second pixel region R2 can be increased by 100% to 500% (in other words, the area of the main spacers 141 in the second pixel region R2 can be 2 to 6 times the area of the main spacers 141 in the first pixel region R1). Herein, "the area of the spacer" refers to the area of the spacer projected onto the first substrate 11 (as shown in FIG. 1B) in a top view.

Figure 6:
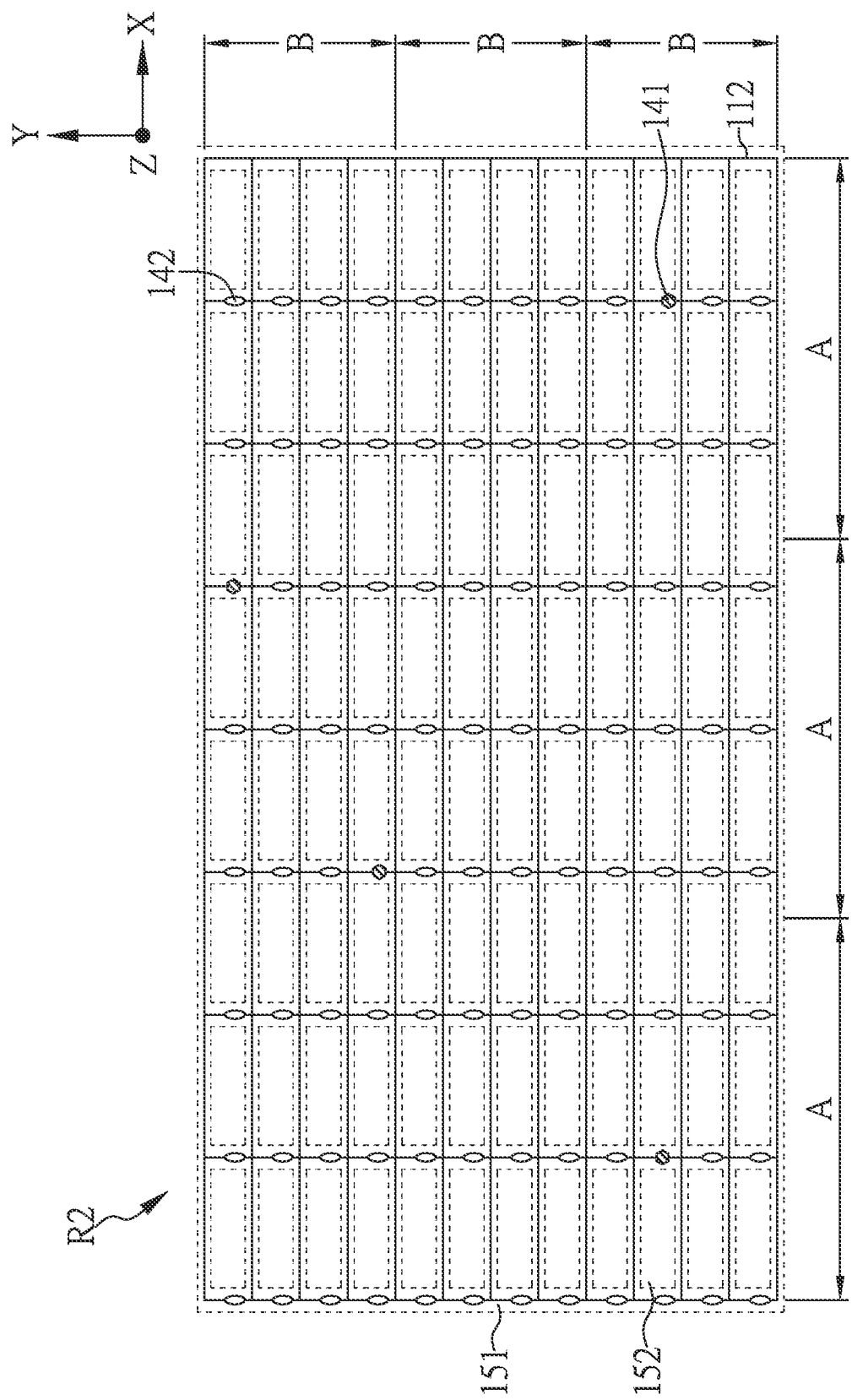
FIG. 6 is a schematic top view of a second pixel region according to another embodiment of the present disclosure.

Please refer to FIG. 2 and FIG. 6. FIG. 6 is a schematic top view of a second pixel region according to another embodiment of the present disclosure. In the display device of the present embodiment, the second pixel region R2 may correspond to a camera pixel region or a face recognition pixel region. In the present embodiment, the structure of the display device and the first pixel region can be similar to those shown in FIG. 1A to FIG. 2, and are not repeated again.

Similar to the embodiment shown in FIG. 4, in the present embodiment shown in FIG. 6, the distribution of the spacers in the region with the length A and the width B shown in FIG. 2 can be used as a basic unit, and this basic unit is repeatedly arranged in the X direction and the Y direction several times. In addition, the main spacers 141 and the sub spacers 142 originally corresponding to the openings 152 are removed, and a part of the main spacers 141 are replaced by the sub spacers 142 to obtain the distribution of the spacers shown in FIG. 6.

One difference between the present embodiment and the embodiment shown in FIG. 4 is that, in the present embodiment, a part of the sub spacers 142 are not replaced by the main spacers 141, but a part of the main spacers 141 are replaced by the sub spacers 142. Thus, on the premise of maintaining the cell gap of the display layer 13 by the spacers with the required minimum disposition density, even though the number of the main spacers 141 is reduced, the cell gap of the display layer 13 still can be maintained and the panel has sufficient ability to withstand pressing.

Similar to the embodiment shown in FIG. as shown in FIG. 2 and FIG. 6, in the present embodiment, the area of the second pixel 112 is 9 times (3×3 times) the area of the first pixel 111, but the present disclosure is not limited to this. When the resolution of the second pixel region R2 is reduced (taking the area of the second pixel 112 is 9 times the area of the first pixel 111 in the present embodiment as an example), the positions where the main spacers 141 and the sub spacers 142 can be disposed in the second pixel region R2 may be one third of the positions in the first pixel region R1 in the same area (for example, the area of the region having the length A and the width B shown in FIG. 2). Thus, in the present embodiment, when the total number of the main spacers 141 and the sub spacers 142 is reduced and a part of the main spacers 141 are replaced by the sub spacers 142 in the second pixel region R2, the number of the main spacers 141 in the second pixel region R2 may be less than one third of the number of the main spacers 141 in the first pixel region R1 and the number of the sub spacers 142 in the second pixel region R2 may be greater than one third of the number of the sub spacers 142 in the first pixel region R1 in the same area (for example, the area of the region having the length A and the width B shown in FIG. 2).

Thus, in the display device of the present embodiment, the quantity ratio of the main spacers 141 to the sub spacers 142 in the first pixel region R1 is different from the quantity ratio of the main spacers 141 to the sub spacers 142 in the second pixel region R2. In particular, in the present embodiment, the quantity ratio of the main spacers 141 to the sub spacers 142 in the first pixel region R1 is greater than the quantity ratio of the main spacers 141 to the sub spacers 142 in the second pixel region R2. For example, the quantity ratio of the main spacers 141 to the sub spacers 142 in the first pixel region R1 may be ranged from 1:1 to 1:60 (1≤the number of the sub spacers/the number of the main spacers≤60), and the quantity ratio of the main spacers 141 to the sub spacers 142 in the second pixel region R2 may be ranged from 1:1 to 1:90 (1≤the number of the sub spacers/the number of the main spacers≤90).

Figure 7:
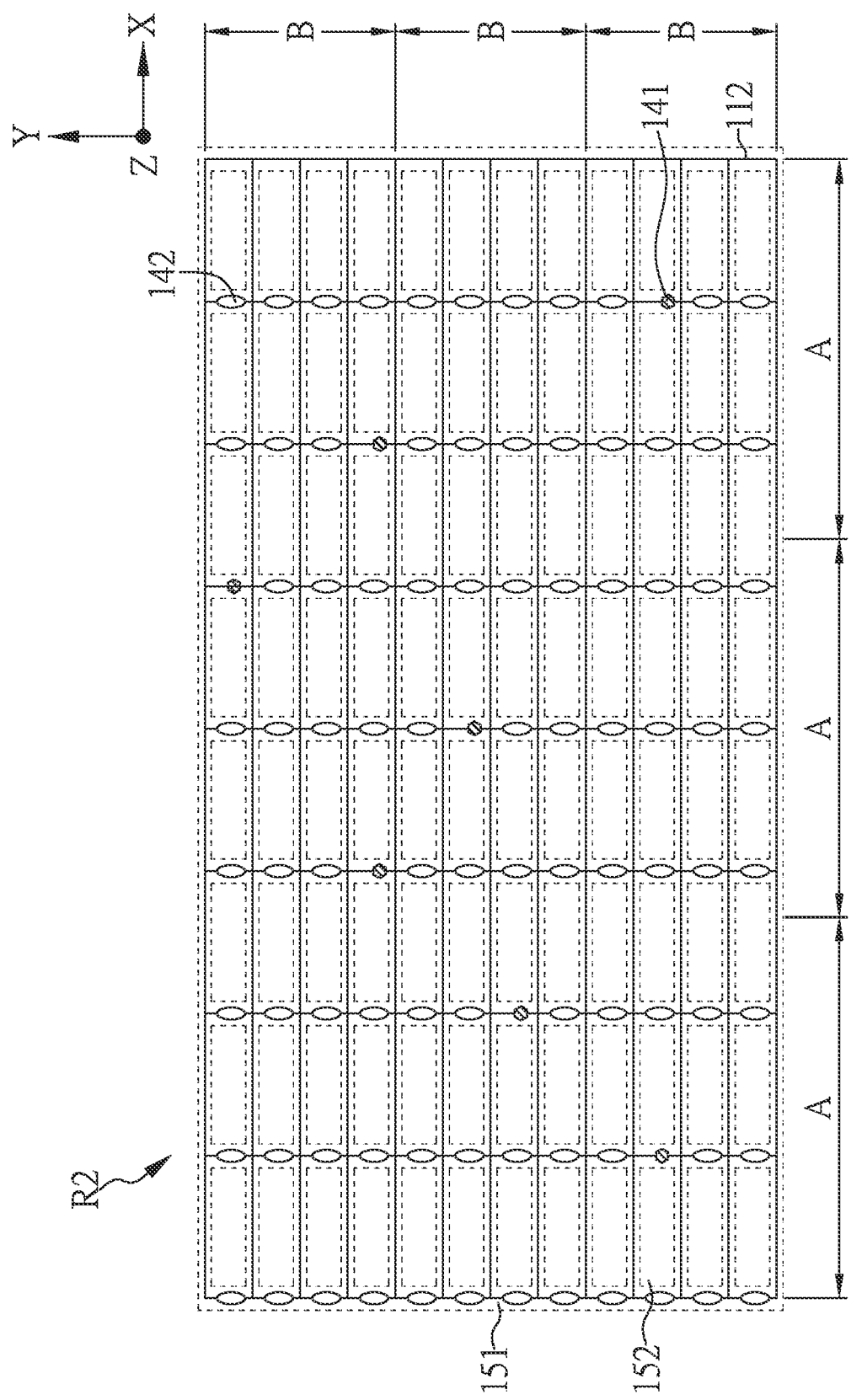
FIG. 7 is a schematic top view of a second pixel region according to further another embodiment of the present disclosure.

FIG. 7 is a schematic top view of a second pixel region according to further another embodiment of the present disclosure. In the display device of the present embodiment, the second pixel region R2 may correspond to a camera pixel region or a face recognition pixel region. In the present embodiment, the structure of the display device and the first pixel region can be similar to those shown in FIG. 1A to FIG. 2, and are not repeated again.

Similar to the embodiment shown in FIG. 5, in the present embodiment shown in FIG. 7, the distribution of the spacers in the region with the length A and the width B shown in FIG. 2 can be used as a basic unit, and this basic unit is repeatedly arranged in the X direction and the Y direction several times. In addition, the main spacers 141 and the sub spacers 142 originally corresponding to the openings 152 are removed to obtain the distribution of the spacers show in FIG. 7.

One difference between the present embodiment and the embodiment shown in FIG. 5 is that, in the present embodiment, the area of the main spacers 141 is not increased but the area of the sub spacers 142 is increased to maintain the ability of the panel to withstand pressing. Although the increasing of the area of the sub spacers 142 may result in the aperture ratio of the second pixel region R2 reduced, the openings 152 corresponding to the second pixels 112 shown in FIG. 5 are greater than the openings 152 corresponding to the first pixels 111 shown in FIG. 2, and the impact on the image displaying is not large.

Thus, in the display device of the present embodiment, the area of the sub spacers 142 in the first pixel region R1 is less than the area of the sub spacers 142 in the second pixel region R2. For example, the area of the sub spacers 142 in the second pixel region R2 can be increased by 100% to 500% (in other words, the area of the sub spacers 142 in the second pixel region R2 can be 2 to 6 times the area of the sub spacers 142 in the first pixel region R1).

FIG. 4 to FIG. 7 show the modifications of some embodiments of the present disclosure, but the present disclosure is not limited thereto. More specifically, the area and the number of the main spacers and the sub spacers in the second pixel region may be selectively modified according to the design modes shown in the following Table 1.

TABLE 1

| Design mode | Main spacers | | Sub spacers | |
|---|---|---|---|---|
| | Number | Area | Number | Area |
| A. | Increase | Unchanged | Decrease | Unchanged |
| B. | Increase | Increase or Decrease | Decrease | Unchanged |
| C. | Increase | Unchanged | Decrease | Increase |
| D. | Increase | Increase or Decrease | Decrease | Increase |
| E. | Decrease | Unchanged | Increase | Unchanged |
| F. | Decrease | Increase | Increase | Unchanged |
| G. | Decrease | Unchanged | increase | Increase or Decrease |
| H. | Decrease | Increase | Increase | Increase or Decrease |
| I. | Unchanged | Increase | Unchanged | Increase |
| J. | Unchanged | Increase | Unchanged | Unchanged |
| K. | Unchanged | Unchanged | Unchanged | Increase |

In Table 1, the "increase or decrease in number" refers to that the distribution of the spacers in a partial region of the first pixel region is used as a basic unit, this basic unit is repeated arranged in the second pixel region, the main spacers and the sub spacers corresponding to the openings in the second pixel region are removed to obtain the first distribution, a part of the main spacers (the sub spacers) are replaced by the sub spacers (the main spacers) and/or the areas of the main spacers and/or the sub spacers are adjusted to obtain the second distribution, and the increase or decrease in the numbers of the main spacers and the sub spacers can be obtained when the second distribution is compared with the first distribution. In addition, the "increase or decrease in area" refers to that the areas of the main spacers or the sub spacers in the second pixel region are increased or decreased, compared with the areas of the main spacers or the sub spacers in the first pixel region. For example, in the embodiment shown in FIG. 4, the basic unit is repeated arranged and a part of the main spacers and sub spacers corresponding to the openings in the second pixel region are removed to obtain the first distribution, and a part of the sub spacers in the second pixel region are replaced by the main spacers to obtain the second distribution. Since a part of the sub spacers in the second pixel region are replaced by the main spacers, compared with the first distribution, the number of the main spacers is increased and the number of the sub spacers is decreased in the second distribution, and the areas of the main spacers and the sub spacers are unchanged. Thus, the embodiment shown in FIG. 4 satisfies the design mode A of Table 1.

In the design modes C, D, F and H, the number of the main spacers or the sub spacers is decreased, so the areas of the main spacers or the sub spacers are not decreased. In the design modes I, J and K, when the numbers of the main spacers and the sub spacers are unchanged, since the number of the spacers in the second pixel region is less than the number of the spacers in the first pixel region, the areas of the main spacers and/or the sub spacers are increased to satisfy the aforesaid requirement.

It should be noted that, in the above embodiments, both the main spacers and the sub spacers are disposed in the second pixel region. However, in some embodiments, the main spacers or the sub spacers may not present in the second pixel region. When the main spacers are not present in the second pixel region, the amount of the liquid crystal molecules may be increased or the disposition density of the main spacers in the first pixel region near to the second pixel region may be increased, to compensate the cell gap of the liquid crystal layer. Similarly, when the sub spacers are not present in the second pixel region, the amount of the liquid crystal molecules may be increased or the disposition density of the sub spacers in the first pixel region near to the second pixel region may be increased, to compensate the ability of the second pixel region to withstand pressing.

In the present disclosure, the features in different embodiments of the present disclosure can be mixed to form another embodiment without departing from the spirit and scope of the disclosure as hereinafter claimed.

Although the present disclosure has been explained in relation to its embodiment, it is to be understood that many other possible modifications and variations can be made without departing from the spirit and scope of the disclosure as hereinafter claimed.

In addition, the aforesaid embodiments are examples for convenience of description, and the claimed scope of the present disclosure should be subjected to the claims, rather than being limited to the aforesaid embodiments.

What is claimed is:

1. A display device, comprising a first pixel region and a second pixel region adjacent to the first pixel region, wherein the display device comprises:
   a first substrate;
   a second substrate opposite to the first substrate; and
   a plurality of spacers comprising a plurality of main spacers with a first height and a plurality of sub spacers with a second height which is smaller than the first height, wherein the plurality of spacers are disposed between the first substrate and the second substrate, wherein a first portion of the plurality of spacers are disposed in the first pixel region, a second portion of the plurality of spacers are disposed in the second pixel region, a disposition density of the second portion of the plurality of spacers in the second pixel region is different from a disposition density of the first portion of the plurality of spacers in the first pixel region,
   wherein the second pixel region is a camera pixel region overlapping a camera in a plan view, and a quantity ratio of the plurality of main spacers to the plurality of sub spacers in the second pixel region is greater than a quantity ratio of the plurality of main spacers to the plurality of sub spacers in the first pixel region, and
   wherein each of the first and second substrates is a non-flexible substrate and flat in both the first pixel region and the second pixel region.

2. The display device of claim 1, wherein an area of one of the plural main spacers of the first portion of the plurality of spacers is less than an area of one of the plural main spacers of the second portion of the plurality of spacers.

3. The display device of claim 2, wherein the area of the one of the plural main spacers of the second portion of the plurality of spacers is 2 to 6 times the area of the one of the plural main spacers of the first portion of the plurality of spacers.

4. The display device of claim 1, wherein an area of one of the plural sub spacers of the first portion of the plurality of spacers is less than an area of one of the plural sub spacers of the second portion of the plurality of spacers.

5. The display device of claim 4, wherein the area of the one of the plural sub spacers of the second portion of the plurality of spacers is 2 to 6 times the area of the one of the plural sub spacers of the first portion of the plurality of spacers.

6. The display device of claim 1, further comprising a plurality of data lines and a plurality of scan lines, wherein the first pixel region comprises a plurality of first pixels, and the second pixel region comprises a plurality of second pixels;
   wherein the plurality of data lines extend along a first direction, the plurality of scan lines extend along a second direction, and a length of one of the plurality of first pixels in at least one of the first direction and the second direction is less than a length of one of the plurality of second pixels in the at least one of the first direction and the second direction.

7. The display device of claim 6, wherein a pixel density of the plurality of second pixels is less than a pixel density of the plurality of first pixels.

8. The display device of claim 1, further comprising a light shielding layer, wherein the light shielding layer comprises a light shielding region, and the plurality of spacers are disposed in the light shielding region.

9. The display device of claim 8, wherein the light shielding layer comprises an infrared penetrating material.

10. The display device of claim 8, wherein the first pixel region comprises a plurality of first pixels, the second pixel region comprises a plurality of second pixels, the light shielding layer has a plurality of openings, and one of the plurality of openings corresponding to one of the plurality second pixels is greater than another one of the plurality of openings corresponding to one of the plurality of first pixels.

11. A display device, comprising a first pixel region and a second pixel region adjacent to the first pixel region, wherein the display device comprises:
   a first substrate;
   a second substrate opposite to the first substrate;
   a plurality of spacers comprising a plurality of main spacers with a first height and a plurality of sub spacers with a second height which is smaller than the first height, wherein the plurality of spacers are disposed between the first substrate and the second substrate, wherein a first portion of the plurality of spacers are disposed in the first pixel region, and a second portion of the plurality of spacers are disposed in the second pixel region;
   a plurality of data lines extending along a first direction; and
   a plurality of scan lines extending along a second direction different from the first direction,
   wherein the first pixel region comprises a plurality of first pixels, the second pixel region comprises a plurality of second pixels, and a length of one of the plurality of first pixels in at least one of the first direction and the second direction is less than a length of one of the plurality of second pixels in the at least one of the first direction and the second direction,
   wherein the second pixel region is a camera pixel region overlapping a camera in a plan view, and a quantity ratio of the plurality of main spacers to the plurality of sub spacers in the second pixel region is greater than a quantity ratio of the plurality of main spacers to the plurality of sub spacers in the first pixel region, and
   wherein each of the first and second substrates is a non-flexible substrate and flat in both the first pixel region and the second pixel region.

12. The display device of claim 11, wherein at least one of the second portion of the plurality of spacers is disposed in one of the plurality of second pixels.

13. The display device of claim 12, wherein the second portion of the plurality of spacers comprises an infrared penetrating material.

14. The display device of claim 11, further comprising a light shielding layer, wherein the light shielding layer comprises a light shielding region, and the plurality of spacers are disposed in the light shielding region.

15. The display device of claim 14, wherein a part of the light shielding region is disposed in the plurality of second pixels.

16. The display device of claim 14, wherein the light shielding layer corresponding to the second pixel region comprises an infrared penetrating material.

17. The display device of claim 14, wherein the light shielding layer has a plurality of openings, and at least two of the plurality of openings corresponds to one of the plurality of second pixels.

18. The display device of claim 17, wherein one of the plurality of openings corresponds to one of the plurality of first pixels.

* * * * *